Patented Mar. 9, 1948

2,437,531

UNITED STATES PATENT OFFICE 2,437,531

CATALYTIC TREATMENT OF HYDROCARBONS

Hal C. Huffman, Long Beach, Calif., assignor to Union Oil Company of California, Los Angeles, Calif., a corporation of California No Drawing. Application December 24, 1942, Serial No. 470,027

8 Claims. (Cl. 196—52)

This invention relates to catalysts and catalytic processes for the processing of the various hydrocarbons and/or hydrocarbon mixtures.

More particularly, the invention relates to the catalytic treatment of hydrocarbon stocks, such as catalytic dehydrogenation of light or normally gaseous hydrocarbons such as propane, propene, butane, butene, isobutane, isobutene and the like and catalytic reforming or hydroforming of commercial naphthas and stocks boiling within the gasoline range to produce improved motor fuels and also to produce aromatic hydrocarbons, such as benzene, toluene, xylenes, naphthalene and substituted naphthalenes and the like. The invention further relates to the catalytic cracking or catalytic reforming of stocks boiling in the kerosene or gas oil ranges.

The principal objects of the invention are to provide a catalyst which is comparatively easy to produce, is not easily poisoned, has a long catalytic life, and the particles of which are capable of retaining their mechanical strength during use and at the same time causes satisfactorily high conversion of the relatively saturated to the more unsaturated hydrocarbons and/or to aromatic hydrocarbons depending upon the hydrocarbon stocks being treated and the conditions of use.

A more specific object of the invention is to provide a catalytic composition containing a material which improves the stability of the catalyst. A further object of the invention is to provide a catalyst of such composition that the catalyst particles originally possess adequate mechanical strength and that the catalyst retains its mechanical strength during use.

Other objects, features and advantages of the invention will become apparent to those skilled in the art as the description thereof proceeds.

Catalytic cracking, dehydrogenation, hydroforming and reforming of hydrocarbons are well known processes. For these purposes many catalytic agents have been employed with varying success. Such catalytic agents include the oxides or other compounds of metals, such as chromium, molybdenum, cobalt, nickel, zinc, iron, lead, cadmium, vanadium, manganese, tantalum, tungsten, titanium, platinum, columbium, scandium, thorium, uranium, zirconium, tin, copper, etc., which compounds are heavy metal compounds and may be produced by an appropriate treatment of the chromates, molybdates, vanadates, sulfates, nitrates, chlorides and other suitable salts of the metals by methods well known in the art. Many of these catalytic agents are effective when supported on such carriers as alumina, magnesia, silica, zirconia, titania, thoria, etc. The oxides of chromium or molybdenum distended on alumina are the preferred catalysts for the above processes. For example, in a process generally described as dehydrogenation a catalyst composed of 5% chromium oxide and 95% alumina is capable of effecting as much as about 28% conversion of normal butane to butene at a temperature of about 1050° F., at substantially atmospheric pressure and a space velocity of 15 to 17 volumes per volume of catalyst per minute. Also in hydroforming operations a typical commercially prepared catalyst consisting of about 9% molybdenum oxide and 91% alumina is capable of increasing the aromatic content of a naphtha boiling between about 220° F. and 280° F. from 14.3% to about 58.1% by volume, at a temperature of about 950° F., a space velocity (liquid) of 1, a gage pressure of 100 pounds per square inch and a hydrogen rate of 3000 cubic feet per barrel of feed.

The above described catalysts, while possessing initially high catalytic activities and relatively high mechanical strengths, have undesirably short catalytic lives and gradually lose mechanical strength during use and for these reasons must be discarded after relatively short periods of use. It is known that the decrease in activity and shortness of life of a catalyst is related to the loss of mechanical strength by the catalyst but the reasons for this loss in mechanical strength and methods of preventing it are not thoroughly understood. It has been considered, however, that the loss of mechanical strength is due to the lack of heat stability of the catalyst and may occur during the use of the catalyst either in the catalyzing stage or more probably to a greater degree during the regeneration stage of the operation, the latter operation often being carried out at higher temperatures than those attained during the catalyzing stage.

A method of testing the heat stability of a catalyst, which has been accepted by the industry as a means of indicating the catalytic life of a catalyst, consists in calcining the catalyst at elevated temperatures such as about 1470° F., or even higher, for a few hours. Many catalysts of the types described above are known to lose mechanical strength in this test and it has been found that in general those which fail to maintain their mechanical strength upon calcination show a decrease in catalytic activity in proportion to their loss in strength, and conversely those catalysts which retain most of their mechanical strength will retain their catalytic activity. Even more important is the fact that it is found that those catalysts which lose their mechanical strength in the calcining test are found to have a relatively short catalytic life and break down in the reactor beds with the formation of large quantities of fines which are detrimental to the proper functioning of the catalyst bed and thus requiring too frequent replacement of the catalyst. On the other hand, catalysts which are found to retain their mechanical strength in the calcining test are found to have a long catalytic life and these catalysts do not break down into fines with ordinary handling or during their normal use in a catalytic process.

For example, a fresh sample of the particular commercially prepared catalyst of the hydroforming type referred to above, after calcining at 1470° F. for six hours, became very soft and powdered easily by rubbing between the fingers and had, therefore, lost most of its mechanical strength. Moreover, the calcining treatment obviously destroyed the activity of this unstabilized catalyst, as indicated by the fact that when a portion of the calcined catalyst was used for hydroforming the same naphtha fraction used in the aforementioned test on the fresh catalyst, the aromatic content of the naphtha increased from 14.3% to only 16.6% by volume.

My invention relates to an improvement in the catalyst composition for use in the above processes for cracking, dehydrogenating, hydroforming, reforming, and the like, as applied to hydrocarbons. Specifically, my invention relates to an improvement in the catalysts of the type composed essentially of alumina on which has been distended an oxide of a metal of the left hand column of the sixth group of the periodic table, or preferably the oxide of molybdenum. The improved catalysts made in accordance with my invention exhibits high catalytic activity both before and after calcination at elevated temperatures and retain their original mechanical strength during this heat treatment.

I have discovered that the inclusion of relatively small amounts of an oxide selected from the class consisting of silica, zirconia and titania in the material used as the catalyst carrier, and such carrier having distended thereon an oxide of a metal selected from the left hand column of the sixth group of the periodic table, such as molybednum or chromium oxide, has the effect of greatly improving the heat stability, thus increasing the mechanical strength upon calcination and the active life of the catalyst. I have found this to be particularly true in the case of silica when the silica has been included in the catalyst carrier composition consisting primarily of an alumina which has been activated. Compositions containing about 1 to 15% by weight of silica and 85 to 99% by weight of alumina have been found to be excellent carriers on which may be distended 1 to 15%, or preferably about 9%, by weight of molybdenum oxide. Preferably the amount of silica should be about 5% based on the silica and alumina ingredients although the silica content may be lowered to about 2% or increased to about 9% without substantially changing the performance of the catalyst made therefrom over that obtained when the catalyts contains the preferred amount of 5% silica. Moreover, although the preferred amount of molybdenum oxide, for example, is about 9% it may be reduced to about 5% or increased to about 12% without appreciably changing the activity of the catalyst. Thus while the final composition of the preferred catalyst will contain about 86.5% by weight of alumina, 4.5% by weight of silica and about 9% by weight of molybdenum oxide catalyst compositions containing about 80 to 93% by weight of alumina, about 2 to 8% by weight of silica and about 5 to 12% by weight of an oxide, such as chromium or molybdenum oxide or the like, are excellent catalysts. Moreover, catalysts comprising about 72 to 93% by weight of alumina, about 1 to 15% by weight of silica and about 1 to 15% by weight of an oxide of a metal selected from the left hand column of the sixth group of the periodic table conform to the composition indicated above for active heat stable catalysts and are desirable catalysts conforming to the intent of my invention.

In accordance with the principles of my invention the catalyst may be prepared by first preparing the carrier consisting of a mixture of alumina and silica and subsequently distending thereon the oxide of a metal selected from the left hand column of the sixth group of the periodic table, such as molybdenum oxide, or an alumina carrier may be first coated or impregnated with silica followed by impregnation with the molybdenum or like metal oxide.

In preparing the catalyst according to the first method, the carrier containing the silica may be prepared by co-precipitating the oxides or hydrous oxides of aluminum and silicon from aqueous solutions of water soluble salts of these metals. Thus, solutions containing appropriate proportions of the water soluble salts of aluminum, such as the chloride, nitrate, or sulfate, and of silicon, such as the tetrachloride, are treated with ammonia or one of the alkali metal hydroxides to precipitate the mixture of silicon and aluminum oxides or hydrous oxides. The precipitate is washed with water to remove water soluble impurities and then dried, or the water washing or leaching process may be carried out before and/or after the drying operation. The primary drying operation is preferably effected at temperatures in the order of 400–500° F. and this is followed by calcining at higher temperatures in the order of 750–1200° F. or even higher. The thus prepared carrier, which may be pilled, pelleted, extruded, or otherwise shaped as well as in the form of granules or powder, is preferably impregnated with an oxide of a metal selected from the left hand column of the sixth group of the periodic table. This impregnation is preferably accomplished by immersing the carrier in a suitably concentrated aqueous solution of a suitable salt of the metal, such as ammonium molybdate, ammonium dichromate, chromium nitrate, or the like. The impregnated catalyst is preferably dried at two temperature levels. The primary drying is effected at a lower temperature in the order of 400–500° F. and the final drying is accomplished at a higher temperature in the order of 750–1000° F. or even higher in those cases where the catalyst is to be employed at higher temperatures. The heating or calcination at such higher temperatures, with or without hydrogen, air, or other reducing or oxidizing agent being present, results in converting the adsorbed salt to the corresponding oxide. The impregnation may be carried out by immersing the freshly prepared and calcined carrier in a solution of known strength of the desired salts 4. A process according to claim 2 in which the followed by removal of the salt solution in excess of that adsorbed by the carrier, said removal being carried out by filtration, such as might be effected by placing the impregnated material in a Büchner funnel arranged so that vacuum can be connected to the bottom of the funnel or by centrifuging, or the like.

As a modification of the above method, the alumina-silica carrier may also be prepared by grinding or otherwise powdering and intimately mixing the desired proportions of alumina and silica, and this mixture may then be pilled or pelleted using small proportions of graphite, rosin, fatty acids, or other lubricating materials followed by a calcining treatment to remove the lubricant. The carrier may then be impregnated with the catalytic material, as described above.

In preparing a catalyst according to the second method an "activated alumina" of commerce, or an alumina prepared by precipitating aluminum oxide or hydrous oxide from an aqueous solution of an aluminum salt by conventional methods, washing to remove water soluble impurities, and drying according to the method described in the above carrier preparation, is first coated with silica to produce the catalyst carrier. The freshly calcined alumina is impregnated with silica by immersing it in a suitably concentrated aqueous solution of a soluble salt of silicon, such as silicon tetrachloride, sodium silicates or the like, or preferably in an aqueous suspension and/or solution of hydrous silicon oxide. The impregnated alumina is dried and calcined or is dried, washed with water to remove impurities, and again dried and calcined at the two temperature levels indicated above in order to convert the silicon salt or hydrous oxide to silica. The thus prepared catalyst carrier, consisting of alumina impregnated with silica, may then be further impregnated with a catalytic material, such as a compound of a metal selected from the left hand column of the sixth group of the periodic table according to the procedure described above for impregnating the alumina-silica carrier.

The invention may perhaps be best understood by reference to the following example which should be considered only as being illustrative of the invention and is not to be taken as in any way limiting my invention.

*Example 1*

A catalyst composed of alumina, silica and molybdenum oxide was prepared as follows:

To about 14 liters of an aqueous solution containing 2260 grams of C. P. aluminum chloride ($AlCl_3.6H_2O$) and 66 grams of C. P. silicon tetrachloride ($SiCl_4$) was added, with agitation, about 30 moles of ammonia in the form of an aqueous solution containing about 10% by weight of $NH_3$. The gelatinous precipitate was washed six times with 12 to 15 liters of water and then extruded from a ⅜ inch nozzle and the resulting worms were dried at gradually increasing temperatures up to 500° F. until no further decrease in volume occurred. The dried material was calcined at 932° F. for two hours and then crushed and screened to 8–20 mesh. This product contained approximately 95.3% by weight of alumina and 4.7% by weight of silica.

320 grams of the thus freshly prepared carrier was placed in a solution composed of 82 grams of C. P. ammonium molybdate and 800 ml. of water. The mixture was agitated by stirring for about ten minutees, allowed to stand for about ten minutes, and then was filtered on a Büchner funnel where it was partially dried by suction. The material was then placed in an electric oven where it was heated for sixteen hours at 500° F. and finally calcined for two hours at 1110° F. to complete the preparation. The catalyst was composed of approximately 86.4% alumina, 9.3% molybdenum oxide and 4.3% silica.

Portions of this catalyst without further treatment, and after calcining at about 1560° F. for six hours, were then used in hydroforming a petroleum naphtha boiling in the range of about 220° F. to 280° F. and containing initially 14.3% by volume of aromatics. The conditions used in the hydroforming operations were similar in both instances and were about the following: liquid in space velocity, 1; reactor block temperature 950° F.; gage pressure, 100 pounds per square inch; hydrogen rate, approximately 3000 cubic feet per barrel of feed and duration of each run, 2 hours.

The operation carried out with the fresh catalyst resulted in a liquid product yield of 71.5% by volume of the feed and a yield of aromatics corresponding to 49.4% by volume, based on the feed. The second portion of the catalyst, which had been calcined at 1560° F. for six hours, resulted in the production of 73.8% by volume of liquid products and 50.0% by volume of aromatics, based on the feed. These data reveal that this catalyst did not lose any of its activity after the severe heat treatment. Moreover, the catalyst particles were observed not only to retain their mechanical strength but they actually became harder after calcination.

It will be noted that although the presence of silica slightly increases the initial activity of a catalyst, its greatest effect is to stabilize the catalyst and cause it to maintain its activity even after a high temperature calcining treatment. Thus in contrast to the failure of the commercial catalyst to retain its activity after calcining at 1470° F. for six hours, the ability of the experimental catalyst to maintain its original activity even after calcination at higher temperatures is considered to be due to the effect of the silica of rendering the latter catalyst heat stable. The effect of the silica is apparently one of stabilizing a catalyst composition rather than as a catalyst per se. In this regard, aluminas containing small percentages of silica or aluminas on which have been distended small proportions of silica and without containing catalytic agents distended thereon, are not active as hydroforming catalysts.

While the catalyst described in the above example is of the hydroforming type and is composed of alumina-molybdenum oxide as the catalyst and silica as the stabilizer, it is within the spirit of my invention to use silica as the stabilizer for other hydroforming or reforming catalysts and also dehydrogenating and cracking catalysts. I prefer to employ those catalysts which use as supports such solid adsorbent materials as alumina, magnesia, and the like, and upon which is distended the oxides of the metals in the left hand column of the sixth group of the periodic table.

Moreover, the hydroforming operations described in the above examples are only illustrative of the possible uses of catalysts stabilized in the various manners outlined above and it is within the scope of this invention to use any or all of the above types of catalysts in carrying out the process or processes generally termed dehydrogenation which may be applied to propane, butanes, pentanes, and like saturated hydrocarbons or mixtures of such lighter paraffin hydrocarbons; propene, butenes, pentenes, and like unsaturated, acyclic hydrocarbons or mixtures of these hydrocarbons; as well as mixtures of the lower molecular weight paraffin and unsaturated hydrocarbons. Also, any or all of the catalysts may be used in the processes normally described as hydroforming, reforming, and the like, and which may also be considered as dehydrogenating or aromatizing processes and which may be used in the processing of petroleum naphthas boiling in the gasoline range in order to improve the knock rating and/or to increase the proportion of aromatics in the product. These catalysts are also effective in cracking or reforming hydrocarbon fractions boiling in the kerosene and gas oil boiling ranges and may be used for catalyzing such conversions which can also be considered to be dehydrogenation, or aromatization processes.

Any or all of the above named processes for the treatment of hydrocarbons may be carried out at temperatures in the range of about 800 to 1300° F. and under gage pressures of about −14 pounds up to about 1000 pounds per square inch using catalysts having the compositions disclosed above which have been prepared according to the principles outlined in the foregoing description.

The foregoing description of my invention is not to be considered as limiting since many variations may be made by those skilled in the art without departing from the scope of the claims or the spirit thereof.

I claim:

1. A process for the catalytic treatment of hydrocarbons which comprises subjecting said hydrocarbons to temperatures between about 800° F. and about 1300° F. under gage pressures in the range of about −14 pounds to about 1000 pounds per sq. in. in the presence of a catalyst consisting essentially of a major proportion of a carrier and a minor proportion of a heavy metal oxide catalytic agent distended thereon, said carrier consisting of a gel selected from the class consisting of precipitated alumina and magnesia containing between about 1% and 9% of silica precipitated in the presence of the entire hydrous precipitated gel.

2. A process for the catalytic treatment of hydrocarbons which comprises subjecting said hydrocarbons to temperatures between about 800° F. and about 1300° F. under gage pressures in the range of about −14 pounds to about 1000 pounds per sq. in. in the presence of a catalyst consisting essentially of a major proportion of a carrier and a minor proportion of an oxide of a metal of the left-hand column of the 6th group of the periodic table distended thereon, said carrier consisting of precipitated alumina containing between about 1% and 9% of silica precipitated in the presence of the entire hydrous precipitated alumina.

3. A process according to claim 2 in which the metal of the 6th group is chromium.

4. A process according to claim 2 in which the metal of the 6th group is molybdenum.

5. A process for the catalytic treatment of hydrocarbons which comprises subjecting said hydrocarbons to temperatures between about 800° F. and about 1300° F. under gage pressures in the range of about −14 pounds to about 1000 pounds per sq. in. in the presence of hydrogen and a catalyst consisting essentially of a major proportion of a carrier and a minor proportion of an oxide of a metal of the left-hand column of the 6th group of the periodic table distended thereon, said carrier consisting of a precipitated alumina containing between about 2 and 9% of silica precipitated in the presence of the entire hydrous precipitated alumina.

6. A process according to claim 5 in which the group 6 metal is chromium.

7. A process according to claim 5 in which the group 6 metal is molybdenum.

8. A process according to claim 5 in which the carrier is prepared by co-precipitating the alumina and silica.

HAL C. HUFFMAN.

REFERENCES CITED

The following references are of record in the file of this patent:

UNITED STATES PATENTS

| Number | Name | Date |
|---|---|---|
| 1,782,857 | Miller et al. | Nov. 25, 1930 |
| 1,994,277 | Griffith | Mar. 12, 1935 |
| 2,098,960 | Frey et al. | Nov. 16, 1937 |
| 2,102,160 | Nashan | Dec. 14, 1937 |
| 2,134,543 | Andrews | Oct. 25, 1938 |
| 2,183,591 | Schulze | Dec. 19, 1939 |
| 2,209,908 | Weiss | July 30, 1940 |
| 2,216,262 | Block et al. | Oct. 1, 1940 |
| 2,217,014 | Grosse et al. | Oct. 8, 1940 |
| 2,242,387 | Boyd | May 20, 1941 |
| 2,270,165 | Groll et al. | Jan. 13, 1942 |
| 2,283,173 | Bates | May 19, 1942 |
| 2,283,854 | Friedman et al. | May 19, 1942 |
| 2,288,336 | Welty, Jr., et al. | June 30, 1942 |
| 2,341,792 | Kanhofer | Feb. 15, 1944 |
| 2,348,599 | Brown | May 9, 1944 |
| 2,348,624 | Hillman | May 9, 1944 |
| 2,361,611 | D'Ouville et al. | Oct. 31, 1944 |
| 2,373,254 | Mattox | Apr. 10, 1945 |
| 2,374,404 | Ahlberg | Apr. 24, 1945 |
| 2,377,728 | Thomas | June 5, 1945 |
| 2,378,208 | Fuller et al. | June 12, 1945 |
| 2,395,836 | Bates | Mar. 5, 1946 |

OTHER REFERENCES

Thorpe's Dictionary of Applied Chemistry, 4th ed., vol. 1, pages 656–658, Longmans, Green and Co. (New York) 1937, Copy in Div. 59.

Edwards, Frary and Jeffries, "The Aluminum Industry, Aluminum and its Production," (1930), McGraw-Hill Book Co. (New York), pages 109 to 111 and 125. Copy in Division 3.